(12) United States Patent
Andersen

(10) Patent No.: US 10,736,331 B2
(45) Date of Patent: Aug. 11, 2020

(54) GUTTING TOOL AND GUTTING DEVICE HAVING A GUTTING TOOL OF THIS KIND

(71) Applicant: LINCO FOOD SYSTEMS A/S, Trige (DK)

(72) Inventor: Torben Andersen, Glesborg (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 16/487,902

(22) PCT Filed: Feb. 22, 2018

(86) PCT No.: PCT/EP2018/054381
§ 371 (c)(1),
(2) Date: Aug. 22, 2019

(87) PCT Pub. No.: WO2018/162245
PCT Pub. Date: Sep. 13, 2018

(65) Prior Publication Data
US 2020/0054031 A1    Feb. 20, 2020

(30) Foreign Application Priority Data

Mar. 9, 2017   (EP) ..................................... 17160146

(51) Int. Cl.
*A22C 21/00*      (2006.01)
*A22C 21/06*      (2006.01)
(52) U.S. Cl.
CPC .......... *A22C 21/06* (2013.01); *A22C 21/0007* (2013.01)
(58) Field of Classification Search
CPC ...... A22C 21/00; A22C 21/06; A22C 21/0046
(Continued)

(56) References Cited

U.S. PATENT DOCUMENTS 3,983,601 A * 10/1976 Verbakel ................ A22C 21/06
452/118
5,549,521 A   8/1996 Van den Nieuwelaar
(Continued)

FOREIGN PATENT DOCUMENTS

EP    0 539 134    4/1993
EP    0 771 529    5/1997
(Continued)

OTHER PUBLICATIONS

Korean Office Action (with English translation) issued in Korean Application No. 10-2019-7022553.
(Continued)

*Primary Examiner* — Richard T Price, Jr.
(74) *Attorney, Agent, or Firm* — Greenblum & Bernstein, P.L.C.

(57) ABSTRACT

The invention relates to an evisceration tool, designed and configured for removing internal organs and in particular an intestine pack from the body of slaughtered poultry, comprising a spoon-shaped basic body, wherein the basic body has a spoon base (12) and a spoon edge which extends around at least part of the spoon base to form a spoon bowl, which is distinguished in that the basic body is made at least partly of a resilient material, wherein the resilient material is on the one hand flexible enough to adapt to a contour of the body during removal of the internal organs and on the other hand stiff enough to remove the internal organs from the body. The invention relates also to an evisceration apparatus having such an evisceration tool.

18 Claims, 3 Drawing Sheets

(58) Field of Classification Search
USPC .................................................. 452/106, 118
See application file for complete search history.

(56) References Cited

U.S. PATENT DOCUMENTS

| | | | |
|---|---|---|---|
| 5,597,350 A | 1/1997 | Hunking | |
| 7,976,367 B2 * | 7/2011 | Sorensen | ............... A22C 21/06 452/118 |
| 2010/0062699 A1 | 3/2010 | Sorensen | |
| 2017/0215440 A1 | 8/2017 | Van Oss | |

FOREIGN PATENT DOCUMENTS

| | | |
|---|---|---|
| EP | 1 011 341 | 6/2000 |
| EP | 2 185 000 | 5/2010 |
| JP | 05-219882 | 8/1993 |
| JP | 6-189670 | 7/1994 |
| KR | 10-2016-0026109 | 3/2016 |
| WO | 98/44806 | 10/1998 |
| WO | 2009/043348 | 4/2009 |
| WO | 2016/013931 | 1/2016 |

OTHER PUBLICATIONS

PCT Written Option (with English translation) issued in PCT/EP2018/054381.
PCT Search Report issued in PCT/EP2018/054381.
Chinese Office Action (with English translation) dated Nov. 28, 2019 issued in Application No. 2018800130158.
Office Action (with English translation) dated Mar. 10, 2020 issued in Japanese patent application 2019-543256.

\* cited by examiner

GUTTING TOOL AND GUTTING DEVICE HAVING A GUTTING TOOL OF THIS KIND

CROSS-REFERENCE TO RELATED APPLICATIONS

The instant application is a US National Stage of PCT/EP2018/054381 filed on Feb. 22, 2018 which application claims priority under 35 USC § 119 of EPO Application No. 17160146.1 filed Mar. 9, 2017.

BACKGROUND OF THE INVENTION

1. Field of the Invention

The invention relates to an evisceration tool, designed and configured for removing internal organs and in particular an intestine pack from the body of slaughtered poultry, comprising a spoon-shaped basic body, wherein the basic body has a spoon base and a spoon edge which extends around at least part of the spoon base to form a spoon bowl.

The invention relates further to an evisceration apparatus, designed and configured for removing internal organs and in particular an intestine pack from the body of slaughtered poultry, comprising a suspension device for suspending decapitated poultry by the legs or joints and at least one evisceration device which carries at least one evisceration tool, wherein the evisceration tool is designed to be movable from a starting position outside the body into a working position inside the body in which the evisceration tool surrounds the internal organs and in particular the intestine pack on the breast side or the rear side of the body, and back.

2. Discussion of Background Information

Such evisceration tools and evisceration apparatuses are used in the animal and in particular in the poultry processing industry for automatically removing internal organs and in particular intestine packs from the poultry. For this purpose, the decapitated, that is to say slaughtered, poultry is transported, suspended by the legs or joints, into the region of an evisceration apparatus. The evisceration apparatus comprises at least one evisceration device having an evisceration tool. For evisceration, the evisceration tool is inserted, from the starting position, into the body, preferably in the region of the anus, forwards and in the direction of the neck. The evisceration tool is then preferably guided along the breastbone and finally pivoted in the direction of the back into a fully advanced position. In this position, the evisceration tool encloses the internal organs on the breast side. In other words, the internal organs are enclosed on one side by the rear-side inside wall of the abdominal cavity of the body and on the other sides, in particular also on the breast side, by the evisceration tool. The internal organs are thus "clamped" between the rear-side inside wall and the evisceration tool. By withdrawing the evisceration tool out of the body into the starting position, the internal organs and in particular also the intestine pack are removed from the body.

The basic body of the evisceration tool comprises a spoon base. The spoon base can be flat or it can already have a slight curvature to form a bowl. The basic body further comprises a spoon edge. The spoon edge surrounds part or the entire periphery of the spoon base. The spoon edge continues the spoon base, as it were, at the sides and, as a side wall or wing, forms, together with the spoon base, a receiving space for the internal organs. When the evisceration tool is in the fully advanced position, the internal organs are thus "trapped" between the evisceration tool and an inside wall of the body or of the abdominal cavity. The surface of the basic body is as smooth as possible on the outside and inside so as not to damage the abdominal cavity, on the one hand, and the internal organs, on the other hand, when the evisceration tool is inserted into the abdominal cavity and removed from the abdominal cavity.

In order to ensure that the internal organs are removed as efficiently, that is to say as completely, as possible, the size and active surface of the evisceration tool should be as large as possible and adapted to the inner contour of the body. However, the size of the animals varies. The larger the animal, the larger the entry opening for the evisceration tool can be and the wider the abdominal cavity and the inner contour thereof. The smaller the animal, the smaller the entry opening for the evisceration tool can be and the narrower the abdominal cavity and the inner contour thereof. If the evisceration tool is too small for the poultry to be processed, it can be introduced into the body without causing any damage, but the internal organs are not enclosed or are only partially enclosed by the evisceration tool and accordingly can only be removed incompletely from the body. If the evisceration tool is too large for the poultry to be processed, that is to say too large for the entry opening and/or the abdominal cavity, there is the risk that bones, for example ribs, collarbone, wishbone, backbone or the like, will be damaged or even broken by the evisceration tool. Accordingly, it is necessary to use evisceration tools of different sizes depending on the size of the poultry to be processed. It is then necessary to change tools according to the size of the animals to be processed. However, this outlay in terms of retooling leads to a loss of time and thus to lower productivity of the evisceration apparatus. Furthermore, there is the problem that usually only two sizes of evisceration tools are used so as to keep the frequency of change within acceptable limits. Each of these evisceration tools covers a specific size range. Ultimately, however, this leads to evisceration operations which are unclean and of poor quality.

EP 1 011 341 B1 describes such an evisceration apparatus having an evisceration tool. The evisceration tool mentioned in the EP specification is made wholly of a hard and inflexible material, namely, for example, stainless steel. It is thus possible to eviscerate only animals of a particular size. Because of the lack of flexibility of the evisceration tool, the tool must be changed according to the size of the poultry to be processed. The resulting disadvantages have already been described in detail above.

SUMMARY OF THE INVENTION

Accordingly, an object underlying the invention is to propose a universally usable evisceration tool which removes the internal organs and in particular the intestine pack from slaughtered poultry of different sizes reliably and completely without damaging the poultry.

This object is achieved by an evisceration tool having the features mentioned hereinbefore in that the basic body is made at least partly of a resilient material, wherein the resilient material is on the one hand flexible enough to adapt to a contour of the body during removal of the internal organs and on the other hand stiff enough to remove the internal organs from the body. With the resilient material, there is described a material that can be deformed or bent at a defined pressure. The basic body can be made partly or wholly of the resilient material in the region of the spoon base or in the region of the spoon edge. As a result of the resilient material, the basic body can be partially pressed together or bent. With this solution according to the invention, there is provided a universal evisceration tool by way of which on the one hand the internal organs of large poultry can be removed from the body completely and without being damaged and on the other hand the internal organs of smaller poultry can be removed from the body completely and without being damaged. Because of the resilient material in the region of the spoon base or of the spoon edge, the pressure that is exerted on the evisceration tool by the body during insertion of the evisceration tool into the body and during guiding of the evisceration tool inside the body results in the evisceration tool being deformed and adapting to the contour of the body as it enters the body and/or inside the body. In other words, the invention provides a standard tool for large and small animals, so that on the one hand it is not necessary to change tools and on the other hand large and small animals can be processed with the same quality.

Owing to the configuration according to the invention, the evisceration tool can be adapted to the largest poultry to be processed. In other words, the evisceration tool can have the largest possible active surface in its starting position and when unloaded. When the evisceration tool is inserted into the body or when the evisceration tool is guided inside the body of large poultry, the active surface can remain unchanged in order to remove the internal organs from the body completely. When the same evisceration tool is inserted into the body or when the evisceration tool is guided inside the body of smaller poultry, the active surface changes, namely it reduces as the size of the poultry becomes smaller, since the body itself exerts pressure on the evisceration tool, which results in the evisceration tool deforming or bending. Accordingly, on the one hand damage or breakages are avoided, and on the other hand it is ensured that the internal organs are removed from the body completely.

A particular advantage is achieved by the design according to the invention in that the flexible tool adapts smoothly to poultry of different sizes. In other words, the active surface is adapted for each animal individually since the body of each animal directly influences the size and thus the active surface of the evisceration tool by the pressure it exerts on the evisceration tool. Each animal moulds the evisceration tool, as it were, individually with its body measurements so that it can be eviscerated optimally and without being damaged.

Preferably, the basic body is made at least partly of the resilient material in the region of the spoon edge. This creates, as it were, flexible wings in the side regions of the basic body which on the one hand are sufficiently rigid to enclose the internal organs completely and guide them out of the body, and on the other hand are sufficiently soft or flexible that they are bent by any resistance, for example by bones or the like, so that the evisceration tool adapts to the inner contour of the abdominal cavity, in particular in the case of poultry of small size, without damaging or even breaking the bones.

Advantageously, the spoon edge comprises two opposing side walls, wherein the side walls are made at least partly of the resilient material. As a result of this form, the active surface of the basic body can be changed particularly simply and effectively.

In a preferred further development of the invention, the spoon base has a recess, wherein a guiding device is arranged in the region of the recess, which guiding device is associated with the spoon base so as to be movable relative thereto. In a waiting position, the recess receives the guiding device preferably completely so as to ensure that the inside and outside surface of the guiding device is flat, or smooth. From this waiting position, the guiding device can be pivoted into a functional position in which the free end of the guiding device is at a distance from the basic body. This guiding device optimises gripping and holding of the internal organs for complete removal.

Advantageously, the spoon base is followed by a spoon holder which is designed and configured for fixing the basic body to an evisceration device. The evisceration tool can thus become part of a mechanical evisceration apparatus.

In a preferred embodiment of the invention the basic body is formed of a plurality of individual parts, wherein the spoon base is made of stainless steel and the spoon edge is made at least partly of the resilient material. The individual parts of different materials can be connected together by vulcanisation, for example, or by other suitable connecting methods. Mechanical connection of the individual parts is also possible. Owing to the hard and inflexible form of the spoon base, the internal organs to be removed can be held securely and guided out of the body. The at least partly resilient spoon edge adapts to the particular conditions of the poultry body to be processed. Efficient and gentle removal of the internal organs is thus ensured.

In another preferred further development of the invention the basic body is in one piece and is made wholly of the resilient material. In this variant, the entire basic body is made of the flexible material, wherein the so-called "sweet point", that is to say the transition region between sufficient stiffness, on the one hand, so as to ensure that the internal organs are removed, and sufficient flexibility, on the other hand, so as to avoid damaging or breaking bones and the like, depends on the size and size range of the animals to be processed.

When the basic body is made wholly of the resilient material, the spoon base advantageously has a greater material thickness than the spoon edge. The thicker spoon base gives the basic body the necessary stability to remove the internal organs reliably and completely. The thinner spoon edge can more easily be bent in order, on the one hand, to facilitate insertion of the evisceration tool into the body and, on the other hand, to ensure optimum adaptation to the inner contour of the abdominal cavity.

Advantageously, the parts of the basic body that are made of the resilient material consist of polyurethane. In addition to polyurethane, other plastics materials that are permitted in the food processing industry can be used. With this material or comparable materials which are food-safe, the requirements of flexibility/softness, on the one hand, and stiffness/hardness, on the other hand, can be particularly well met.

Particularly preferably, the hardness of the resilient material is in a range of from 50 to 140 Shore and preferably in a range of from 70 to 100 Shore. The mentioned "sweet point" can be achieved with such materials and their hardness.

The object is also achieved by an evisceration apparatus having the features mentioned hereinbefore in that the or each evisceration tool is designed according to one or more of claims 1 to 10. The resulting advantages have already been described in connection with the evisceration tool so that, in order to avoid repetition, reference is made to the above passages.

BRIEF DESCRIPTION OF THE DRAWINGS

Further expedient and/or advantageous features and further developments of the evisceration tool and of the evisceration apparatus will become apparent from the dependent claims and the description. Particularly preferred embodiments of the evisceration tool and of the evisceration apparatus are explained in greater detail with reference to the accompanying drawing, in which:

DETAILED DESCRIPTION OF THE INVENTION

Figure 1:
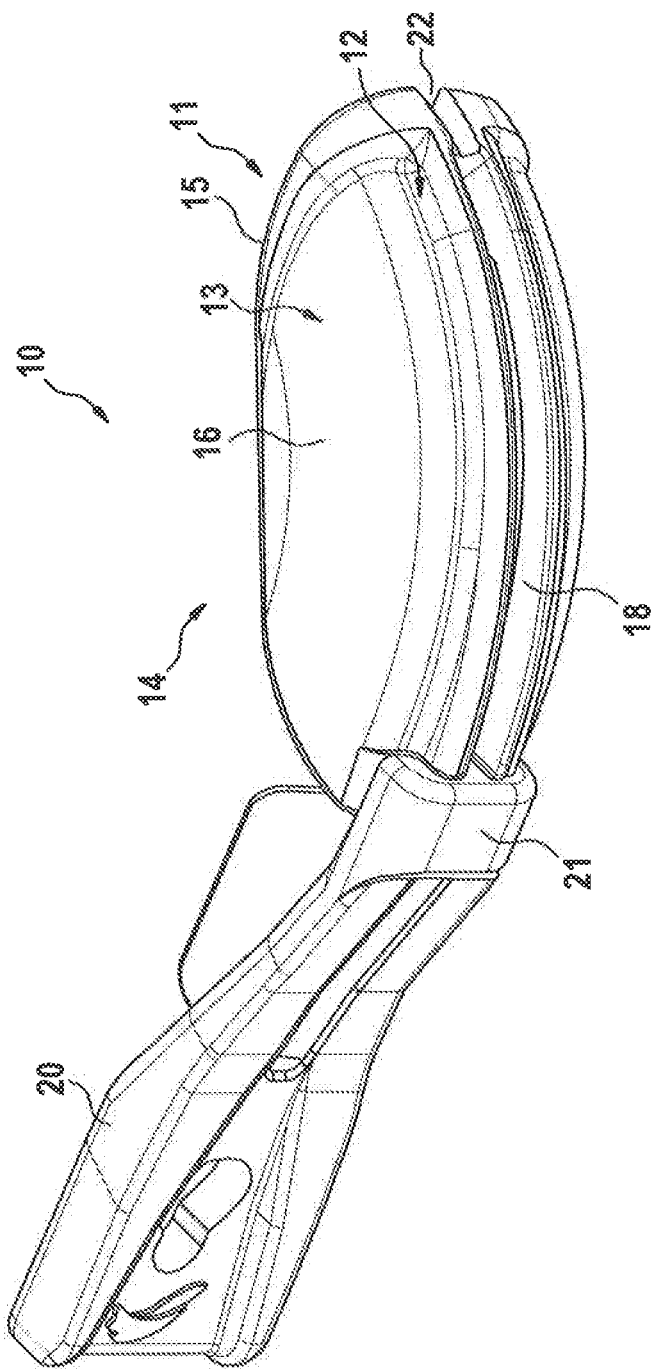
FIG. 1 is a perspective view, in diagrammatic form, of a first embodiment of an evisceration tool.

The evisceration tool shown in the drawing and the evisceration apparatus shown serve to remove internal organs from a poultry body. The evisceration tool and the evisceration apparatus can, however, be used in the same manner for removing internal organs from other animal bodies.

The evisceration tool 10 is designed and configured for removing internal organs and in particular an intestine pack from the body of slaughtered poultry and comprises a spoon-shaped basic body 11, wherein the basic body 11 has a spoon base 12 and a spoon edge 13 which extends around at least part of the spoon base 12 to form a spoon bowl 14. The spoon base 12 can be flat. Preferably, the spoon base 12 has a curvature which is followed seamlessly by the spoon edge 13, which extends the spoon base 12 outwards and upwards so that a spoon bowl 14 of greater depth is formed. The size of the basic body 11, or the dimensions thereof, describe the active surface of the evisceration tool 10.

This evisceration tool 10 is distinguished according to the invention in that the basic body 11 is made at least partly of a resilient material, wherein the resilient material is, on the one hand, flexible enough to adapt to a contour of the body during removal of the internal organs and, on the other hand, stiff enough to remove the internal organs from the body.

The features and further developments described hereinbelow are preferred embodiments on their own or in combination with one another. It is expressly pointed out that features which are combined in the claims and/or the description and/or the drawing or which are described in a common embodiment can also develop the above-described evisceration tool 10 further in a functionally independent manner.

The evisceration tool 10 can be made wholly or partly of resilient material in the region of the spoon base 12 and/or in the region of the spoon edge 13. In embodiments which are not shown, a preferably centrally arranged strip of resilient or flexible material can be formed or exist in the region of the spoon base 12, for example. This strip of the soft material extending, for example, in the longitudinal direction L of the spoon base 12 can form a predetermined bending point, for example, so that the two halves of the basic body are pressed together under a load acting from the outside, for example initiated by the body of the poultry on insertion of the evisceration tool 10 into the body. The basic body 11 thus becomes narrower and has a reduced active surface.

Figure 2:
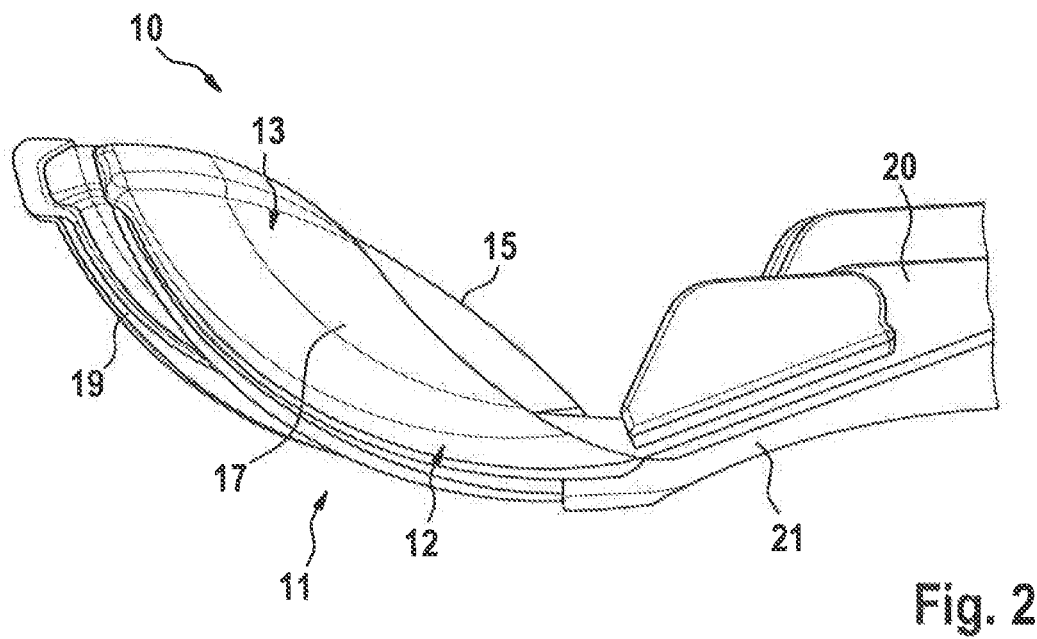
FIG. 2 is a side view, in diagrammatic form, of a further embodiment of the evisceration tool having a guiding device.
Figure 3:
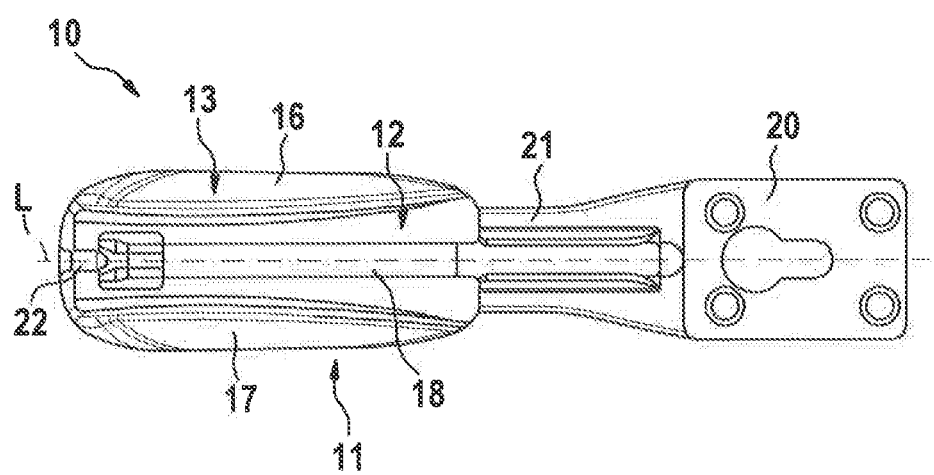
FIG. 3 is a top view, in diagrammatic form, of a further embodiment of the evisceration tool.
Figure 4:
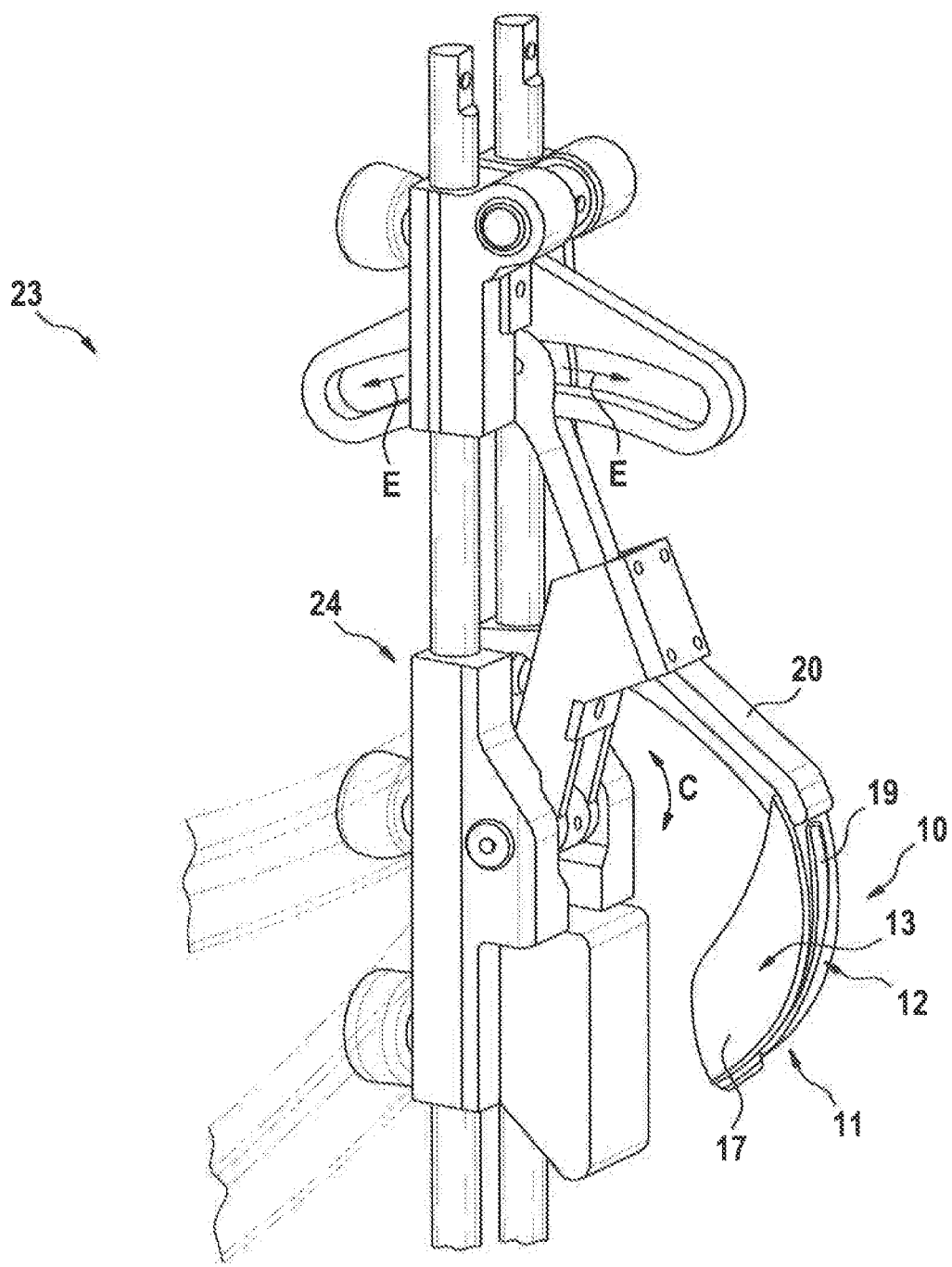
FIG. 4 is a view, in diagrammatic form, of a detail of an evisceration apparatus having an evisceration tool.

Particularly preferably, the basic body 11 is made at least partly of the resilient material in the region of the spoon edge 13. The spoon edge 13 extends upwards and outwards, starting from the spoon base 12, to a free edge 15. Advantageously, at least the upper region of the free edge 15 is made of the resilient material. In other embodiments, it is also possible for the entire spoon edge 13 to be made of the resilient material. The spoon edge 13 can extend around the spoon base 12 completely. However, the spoon edge 13 can also have breaks in its periphery. In the embodiments of FIGS. 1 to 3, the spoon edge 13 comprises two opposing side walls 16, 17, wherein the side walls 16, 17 are made at least partly of the resilient material. Optionally, it is also possible for only one of the side walls 16 or 17 to be made of the resilient material.

In a preferred further development of the evisceration tool 10, the spoon base 12 has a recess 18, wherein a guiding device 19 is arranged in the region of the recess 18, which guiding device is associated with the spoon base 12 so as to be movable relative thereto. The recess extends preferably over at least a portion of the total length of the spoon base 12 parallel to the longitudinal extent L (see in particular FIG. 3). The recess 18 can be on the outside of the spoon base 12 in the form of a depression or also on the inside of the spoon base 12 in the form of a depression. However, the recess 18 can also be provided as a through-opening. Optionally, the guiding device 19 is associated with the recess 18. The guiding device 19, preferably a rod of stainless steel or the like adapted to the curvature of the spoon base 12, is pivotably arranged on the spoon base 12. The guiding device 19 can also be pivotably mounted on a spoon holder 20 which can be adjacent to the spoon base 12. The spoon holder 20 is designed and configured for fixing the basic body 11 to an evisceration device.

Particularly preferably, the guiding device 19 is pivotably mounted in the transition region from the spoon holder 20 to the spoon base 12, that is to say in the region of a shank 21. The recess 18 extends starting from the shank 21 towards the free end of the basic body 11 and ends at a distance from the free end. At the free end of the basic body 11 there is provided a cut 22. In a first position of the guiding device 19, in which the guiding device 19 lies in the recess 18, the free end of the guiding device 19 closes this cut 22. In a second position of the guiding device 19, in which the guiding device 19 is pivoted out of the recess 18, the cut 22 forms an opening which is designed and configured for receiving the trachea/gullet (as part of the internal organs) of the animals to be processed.

In one embodiment, the basic body 11 can be formed of a plurality of individual parts. In such a form, the spoon base 12 is preferably made of stainless steel and the spoon edge 13 at least partly of the resilient material. Other material combinations of materials that are permitted in the food processing industry are of course possible. The spoon holder 20 is preferably also made of stainless steel or the like. The spoon holder 20 is fixedly connected to the spoon base 12. The side walls 16, 17, which in the embodiments of FIGS. 1 to 3 are made of resilient material, are optionally fitted on, set into guide slots or, particularly preferably, connected to the spoon base 12 by way of vulcanisation. Other connections between the spoon edge 13 and the spoon base 12 are likewise possible.

In further embodiments, the basic body 11 can be in one piece. Such a one-piece basic body 11 is then made wholly from the resilient material. The basic body 11 can consist uniformly and throughout of a material having a single hardness. However, the basic body 11 can also consist of a material that has different hardnesses in different regions, for example the spoon base 12, on the one hand, and the spoon edge 13, on the other hand. The choice of material and the hardness of the material depend—in order to find the "sweet point" already mentioned—on the size of the animals to be processed. Optionally, the material thicknesses of the spoon base 12 and the spoon edge 13 can also vary. Preferably, the spoon base 12 has a greater material thickness than the spoon edge 13.

Polyurethane (PU) can preferably be used as the resilient material. Of course, other plastics materials that are permitted in the food processing industry and have comparable material properties can also be used. It is also possible in principle to use flexible metals or metal sheets as the resilient material. The hardness of the resilient material is preferably in a range of from 50 to 140 Shore and particularly preferably in a range of from 70 to 100 Shore. According to and above all in dependence on the size of the animals to be processed, the hardness values can also be below or above the mentioned range.

The evisceration tool 10 can be used as a single part, an exchange part or a replacement part. Preferably, the evisceration tool 10 is part of an evisceration apparatus 23. This evisceration apparatus 23 is designed and configured for removing internal organs and in particular an intestine pack from the body of slaughtered poultry and comprises a suspension device for suspending decapitated poultry by the legs or joints and at least one evisceration device which carries at least one evisceration tool 10, wherein the evisceration tool 10 is designed to be movable from a starting position outside the body into a working position inside the body in which the evisceration tool surrounds the internal organs and in particular the intestine pack on the breast side or the rear side of the body, and back. According to the invention, the evisceration tool 10 is designed according to one or more of claims 1 to 10.

Preferably, the evisceration apparatus 23 comprises a plurality of evisceration devices 24, each of which has an evisceration tool 10. Such known evisceration apparatuses 23 are described, for example, in EP 2 185 000 B1, the content of which is hereby incorporated in this application in respect of the construction of such evisceration apparatuses 23 and the functioning thereof.

In the following, the removal of internal organs by way of an evisceration tool 10 will be described in greater detail for animals of different sizes as regards the flexible adaptation of the evisceration tool 10.

In the case of the processing of a larger animal, the evisceration tool 10 is fed and inserted forwards and in the direction of the neck. Preferably, the evisceration tool 10 enters the poultry, suspended with its head hanging down, in the region of the anus. The evisceration tool 10 thereby has its maximum active surface. Inside the body, or the abdominal cavity, the evisceration tool 10 is preferably first moved towards the breastbone and then along the breastbone from top to bottom in the direction of the gullet and the trachea and then pivoted away from the breastbone towards the back into a fully advanced position. In this position, the evisceration tool 10 encloses the "collected" internal organs completely in the spoon bowl 14 and presses them against the inside wall of the abdominal cavity on the rear side. The internal organs are thereby enclosed between the inside wall of the abdominal cavity and the evisceration tool 10. In this position, the evisceration tool 10 is withdrawn from the abdominal cavity, whereby the internal organs are likewise removed from the abdominal cavity and thus from the body.

If a smaller animal is eviscerated thereafter, the same evisceration tool 10 is fed and inserted into the body of the poultry forwards and in one movement in the direction of the neck. Preferably, the evisceration tool 10 enters the poultry, with its head hanging down, in the region of the anus. Should the entry to the abdominal cavity be narrower than the evisceration tool 10 with its maximum active surface, the evisceration tool 10 is brought into a suitable shape by the contour of the body, the active surface being reduced. To put it simply, as the evisceration tool 10 enters the body, for example, in the region of the anus, it is pressed together in the region of the spoon base 12 or preferably in the region of the spoon edge 13, so that the evisceration tool 10 becomes smaller in its external dimensions and entry can take place without causing damage. Inside the abdominal cavity, the evisceration tool 10 adapts to the inner contour of the poultry to be processed as it is guided preferably along the breastbone by the resilient material of at least parts of the basic body 11. In other words, the spoon edge 13 is preferably pressed into the appropriate shape by the inner contour of the abdominal cavity, so that the movements necessary for "collection" of the viscera take place inside the abdominal cavity without causing damage. When the evisceration tool 10 is subsequently withdrawn, the evisceration tool 10 is deformed as it was for entry.

Owing to the design according to the invention of the evisceration tool 10 it is not necessary to change the evisceration tool 10. Poultry of different size ranges can be eviscerated using a single size of tool without being damaged, the internal organs being removed from the body completely and reliably in each case.

The invention claimed is:

1. An evisceration tool designed and configured for removing internal organs from a body of slaughtered poultry, comprising:
    a spoon-shaped basic body having a spoon base and a spoon edge which extends around at least part of the spoon base to form a spoon bowl,
    wherein the basic body is made at least partly of a resilient material, and
    wherein the resilient material is flexible enough to adapt to a contour of the body during removal of the internal organs and while also being stiff enough to remove the internal organs from the body.

2. The evisceration tool according to claim 1, wherein the basic body is made at least partly of the resilient material in a region of the spoon edge.

3. The evisceration tool according to claim 1, wherein the spoon edge comprises two opposing side walls made at least partly of the resilient material.

4. The evisceration tool according to claim 1, wherein the spoon base has a recess, and further comprising a guiding device arranged in a region of the recess, said guiding being associated with the spoon base so as to be movable relative thereto.

5. The evisceration tool according to claim 1, wherein the spoon base extend from or is coupled to a spoon holder which is designed and configured for fixing the basic body to an evisceration device.

6. The evisceration tool according to claim 1, wherein the basic body is formed of a plurality of individual parts, and wherein the spoon base is made of stainless steel and the spoon edge is made at least partly of the resilient material.

7. The evisceration tool according to claim 1, wherein the basic body is a one piece member and is made entirely of the resilient material.

8. The evisceration tool according to claim 7, wherein the spoon base has a greater material thickness than the spoon edge.

9. The evisceration tool according to claim 1, wherein the resilient material consist of polyurethane.

10. The evisceration tool according to claim 1, wherein a hardness of the resilient material is in a range of one of:
from 50 to 140 Shore; and
from 70 to 100 Shore.

11. An evisceration apparatus designed and configured for removing internal organs from a body of slaughtered poultry, comprising:
a suspension device for suspending decapitated poultry by legs or joints; and
at least one evisceration device configured to carry at least one evisceration tool of claim 1,
wherein the evisceration tool is designed to be movable from a starting position outside the body into a working position inside the body in which the evisceration tool surrounds the internal organs.

12. The evisceration apparatus according to claim 11, wherein the internal organs comprise an intestine pack.

13. The evisceration apparatus according to claim 11, wherein, in the working position, the evisceration tool surrounds the internal organs on a breast side of the body.

14. The evisceration apparatus according to claim 11, wherein, in the working position, the evisceration tool surrounds the internal organs on a rear side of the body.

15. The evisceration tool according to claim 1, wherein the internal organs comprise an intestine pack.

16. The evisceration tool according to claim 1, wherein the resilient material is a plastic material.

17. An evisceration tool designed and configured for removing internal organs from a body of slaughtered poultry, comprising:
a spoon-shaped basic body comprising:
a spoon base;
two side walls; and
a spoon edge which extends around at least part of the spoon base to form a spoon bowl,
wherein at least a portion of said basic body is made of a resilient material that is flexible enough to adapt to a contour of the body during removal of the internal organs and while also being stiff enough to remove the internal organs from the body.

18. An evisceration tool designed and configured for removing internal organs from a body of slaughtered poultry, comprising:
a plastic material spoon-shaped basic body comprising:
a spoon base; and
a spoon edge which extends around at least part of the spoon base to form a spoon bowl,
wherein the plastic material is flexible enough to adapt to a contour of the body during removal of the internal organs and while also being stiff enough to remove the internal organs from the body.

* * * * *